United States Patent [19]

Bernier

[11] 4,441,586

[45] Apr. 10, 1984

[54] DEVICE FOR IMMOBILIZING A WHEELED VEHICLE

[76] Inventor: Jean P. Bernier, 2000 S. Eads St., Arlington, Va. 22202

[21] Appl. No.: 312,746

[22] Filed: Oct. 19, 1981

[51] Int. Cl.³ .......................... E05B 73/00; B60T 3/00
[52] U.S. Cl. .......................................... 188/32; 70/19; 70/225
[58] Field of Search .......................... 70/19, 225–227; 188/32

[56] References Cited

U.S. PATENT DOCUMENTS

| 2,844,954 | 7/1958 | Marugg | 188/32 X |
| 2,960,857 | 11/1960 | Winter | 70/19 |
| 3,828,590 | 8/1974 | Thiebault | 70/225 X |

OTHER PUBLICATIONS

Brochure: Omicron Systems, Inc.
Brochure: Auto-Boot, Inc.

Primary Examiner—Duane A. Reger
Attorney, Agent, or Firm—Bacon & Thomas

[57] ABSTRACT

An improved device for immobilizing or impounding a land or air vehicle having at least one wheel assembly against movement on the ground, wherein the device includes a pair of pivotal jaws for embracing the wheel assembly, with a pair of inwardly directed teeth carried by the jaws for engaging opposed portions of the wheel rim. An adjustable bolt is provided for limiting the degree of pivotal movement of the jaws to permit the device to accommodate the size of a given wheel assembly and secure the device in a position of use. A locking mechanism prevents theft or unauthorized removal of the vehicle by denying access to the adjustable bolt.

8 Claims, 5 Drawing Figures

DEVICE FOR IMMOBILIZING A WHEELED VEHICLE

BACKGROUND OF THE INVENTION

1. Field of the Invention

The present invention generally pertains to security systems for securing vehicles in a fixed position on the ground. More specifically, the invention relates to an improved device for immobilizing or impounding a wheeled land or air vehicle on the ground and preventing its unauthorized use or theft.

2. Description of the Prior Art

The need has always existed for government and local agencies to assure that wheeled vehicles, particularly motorcycles, automobiles, trucks and airplanes, are utilized in compliance with existing laws and ordinances. There is also an increasing need to provide adequate security measures for preventing the unauthorized use or theft of such vehicles, particularly by individuals desiring to use the vehicles in the commission of crimes.

The prior art has proposed various systems for preventing or discouraging the unauthorized use of vehicles, including devices installed by the manufacturer for securing the vehicle ignition system and devices for attachment to the exterior of the vehicle to prevent its movement on the ground. One of the more effective devices in this latter category involves an apparatus commonly referred to as the "auto-boot", which device is essentially in the form of a clamp that is locked in engagement with the tire and rim of an automobile, thereby preventing movement of the vehicle by the driver until an imposed fine or other sanction has been satisfied. The "booting" of automobiles is presently practiced in several states and functions primarily as an efficient immobilizing measure for impounding the vehicle at the location where the auto-boot is attached. The primary purposes of booting include improving traffic circulation and environmental safety, as well as increasing parking turnover and municipal revenues.

Heretofore, auto-boots have been specifically designed for use in impounding automobiles. However, there has been an alarming increase in the theft of airplanes for the purpose of conducting illegal drug trade and traffic since such air vehicles provide an efficient and often undetectable mode of international travel. Accordingly, there exists a critical need for an improved device which will not only be able to provide a secure immobilization of most wheeled vehicles, but is further specifically designed for immobilizing airplanes, particularly private single engine aircraft and twin engine aircraft, on the ground against theft and unauthorized use.

SUMMARY OF THE INVENTION

The improved immobilization device of the invention comprises an active jaw and a passive jaw which are connected together for pivotal movement between an open position and a closed position. The jaws are resiliently biased towards the closed position and are opened by pressing a pair of handles together, thereby permitting the jaws to close upon and embrace the wheel assembly of the vehicle to be immobilized. The jaws each include an inwardly directed tooth having a substantially cylindrical configuration and a beveled free end for securely engaging opposed portions of the wheel rim. When the device is in place on the wheel assembly, a wrench is used for adjusting a lock bolt which serves to tighten the jaws about the wheel assembly and prevents removal of the device by limiting the outward pivotal movement of the jaws. The lock bolt is enclosed within the body of the device and provided with a locking mechanism which denies access to the lock bolt, thereby preventing unauthorized removal of the device from the wheel assembly. The improved design of the device and its construction from almost indestructible materials render removal of the device from a vehicle immobilized therewith practically impossible in the absence of destroying the device by means of extraordinary measures.

It is therefore an object of the present invention to provide an improved device for immobilizing or impounding a wheeled vehicle against movement on the ground.

It is another object of the invention to provide a device for immobilizing an airplane against movement on the ground to prevent its theft or unauthorized use.

it is a further object of the invention to provide an improved immobilizing device which is simple in construction, economical to manufacture and easy to apply to the wheel assembly of a vehicle being immobilized.

It is yet another object of the invention to provide an improved immobilizing device for wheeled vehicles which is extremely rugged in structure and practically impossible to destroy or remove from a wheel assembly immobilized therewith.

These and other objects, features and advantages of the invention will be become apparent from the following detailed description of specific embodiments thereof, with reference to the accompanying drawings, which form a part of the specification, wherein like reference characters designate corresponding parts of the several views.

DETAILED DESCRIPTION OF THE PREFERRED EMBODIMENTS

Figure 1:
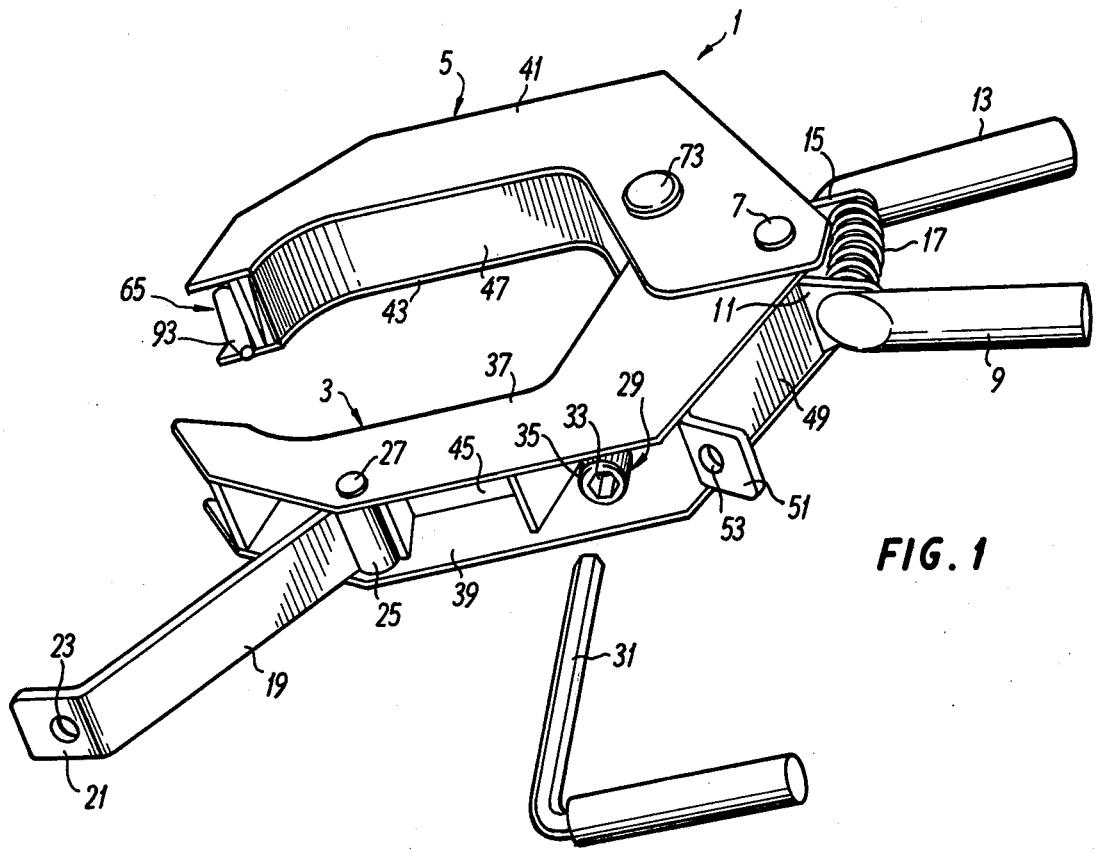
FIG. 1 is a perspective view depicting a preferred embodiment of the invention showing the locking mechanism in a deactivated condition for permitting access to the lock bolt and the wrench for adjusting the lock bolt.

A device 1 for immobilizing a wheeled vehicle according to the present invention is shown in FIG. 1. Device 1 includes an active jaw 3 and a passive jaw 5 which are connected for pivotal movement with respect to each other at one pair of corresponding ends by a pivot pin 7. A handle 9 is connected to active jaw 3 through a jaw fork 11. Similarly, a handle 13 is connected to passive jaw 5 through a jaw fork 15. A coil spring 17 is disposed and secured between the exposed ends of forks 11 and 15 for the purpose of biasing handles 9 and 13 outwardly away from each other, thereby correspondingly biasing jaws 3 and 5 inwardly towards a closed position. The spreading or opening of jaws 3 and 5 is accomplished by manually grasping handles 9 and 13 and bringing same towards each other against the bias of spring 17.

Jaws 3 and 5 are each substantially in the form of a rigid hollow housing, the internal details of which shall later be described in detail. As shown in FIG. 1, active jaw 3 includes a hasp 19 having a free end defined by an outwardly angled flange 21 provided with an aperture 23 therethrough. The other end of hasp 19 is attached to active jaw 3 by connecting hasp 19 to a barrel 25 of substantially cylindrical-shape through which a hasp pin 27 is passed, thereby permitting free pivotal movement of hasp 19 about pin 27. With hasp 19 shown in its open position in FIG. 1, access is permitted to an adjustable lock bolt 29 disposed interiorly of jaws 3 and 5. Adjustment of lock bolt 29 is preferably accomplished by means of an allen-type wrench 31 which may be inserted within a correspondingly-shaped recess 33 provided in a head 35 of lock bolt 29. As shall hereinafter be described in further detail, adjustment of lock bolt 29 by wrench 31 serves to vary and limit the outward pivotal movement of jaws 3 and 5 towards an open position, thereby serving to secure device 1 in a position of use.

Active jaw 3 is comprised of a pair of opposed upper and lower plates 37 and 39, respectively. Similarly passive jaw 5 also includes a pair of correspondingly shaped opposed upper and lower jaw plates 41 and 43, respectively. As apparent in FIG. 1, the spacing between plates 37 and 39 is somewhat less than that between plates 41 and 43 to permit the insertion of active jaw 3 within passive jaw 5 for pivotal movement at pin 7. The interior side of active jaw 3 is enclosed by an inner cover plate 45 disposed between and perpendicular to plates 37 and 39. Similarly, the interior side of passive jaw 5 is also provided with an inner cover plate 47 which is disposed between and perpendicular to plates 41 and 43 in the same manner. The exterior side of active jaw 3 is partially enclosed by placing hasp 19 in its closed position wherein its exterior surface is flush with the exterior edges of plates 37 and 39. A portion of the exterior side of active jaw 3 is also enclosed by a cover plate 49 provided with an outwardly turned flange 51 having an aperture 53 therethrough. With hasp 19 in its closed position, flanges 21 and 51 are disposed adjacent and parallel to each other with apertures 23 and 53 being aligned for a purpose to be hereinafter described.

Figure 2:
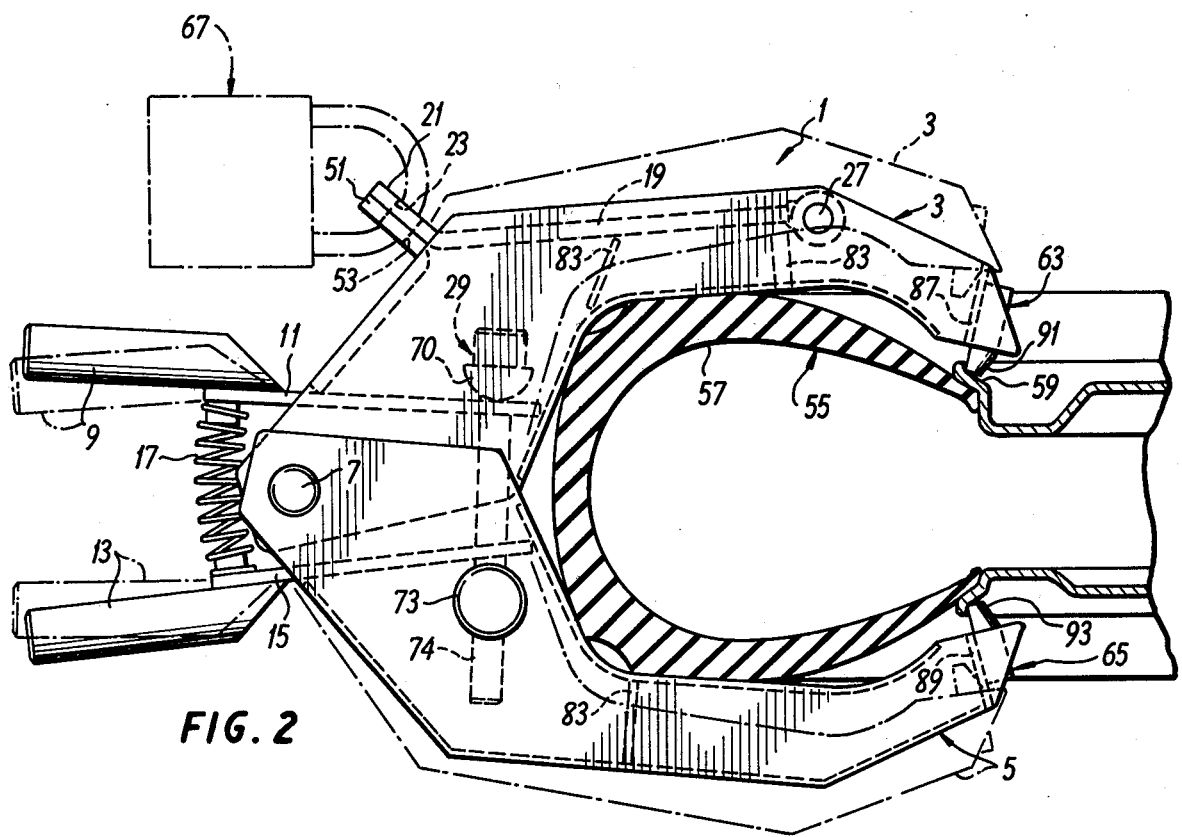
FIG. 2 is a top view of the device of FIG. 1 shown in a position of use on a wheel assembly, with phantom lines depicting the pivotal jaws in an open position and a padlock for securing the locking mechanism in a closed position in which access to the lock bolt is denied to unauthorized persons.

With reference now to FIG. 2, device 1 is shown in a position of use wherein a wheel assembly 55 is immobilized against travel on the ground. Wheel assembly 55 may be that typically associated with either a land or air vehicle and generally includes an inflated tire 57 which is mounted onto a rim 59 of a hub 61. This basic configuration will understandably vary with the type of vehicle, particularly in the case of aircraft wherein the hub may be partially defined by spokes or other structure not conventionally associated with hubs of land vehicle wheel assemblies. It is a specific purpose of this invention to provide an immobilizing device which is particularly suited for immobilizing wheel assemblies having a variety of configurations, including uncommon structural designs.

As apparent from FIG. 2, active jaw 3 and passive jaw 5 are each of a substantially C-shaped configuration to accommodate the basic cross-sectional configuration of wheel assembly 55. In the position of device 1 as shown in phantom lines, jaws 3 and 5 are in a substantially open position with handles 9 and 13 being correspondingly brought together against the bias of spring 17. This permits device 1 to be placed over wheel assembly 55 for attachment thereto. When this is accomplished, lock bolt 29 is adjusted to secure jaws 3 and 5 against rim 59 and prevent relative pivotal movement in the outward direction. This latter position is shown by device 1 in solid lines in FIG. 2.

An important aspect of device 1 as shown in its position of use in FIG. 2 comprises a pair of inwardly directed opposed teeth 63 and 65 provided on the corresponding free ends of active jaw 3 and passive jaw 5, respectively. With device 1 in this position, teeth 63 and 65 securely engage opposed portions of rim 59. Because of the unique configuration of teeth 63 and 65, as shall be hereinafter further detailed, device 1 is capable of being used in conjunction with a variety of rim configurations, notwithstanding the type of vehicle with which such rims are associated. Once in its position of use, access to lock bolt 29 is denied by closing hasp 19 to place flanges 21 and 51 adjacent each other so that the bail of a padlock, generally indicated at 67, may be passed through aligned apertures 23 and 53 to lock hasp 19 in its closed position. When this has been accomplished, it is difficult, if not altogether impossible, for an unauthorized individual to remove device 1 from wheel assembly 55 in the absence of utilizing extreme measures or destroying both padlock 67 and device 1.

Figure 3:
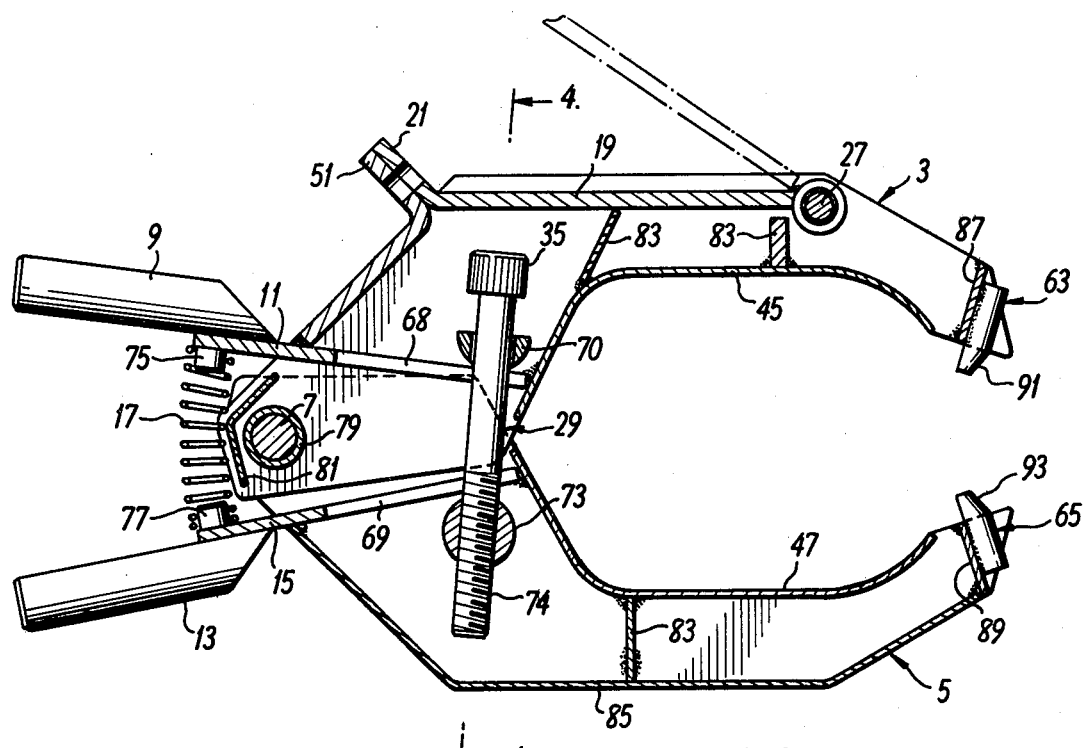
FIG. 3 is a cross-sectional top view of the device depicted in FIG. 2 with the pivotal jaws shown in a substantially closed position but without the wheel assembly and padlock.
Figure 4:
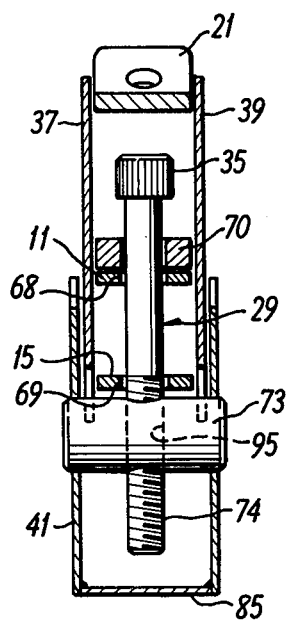
FIG. 4 is a cross-sectional view taken along the line 4—4 of FIG. 3.
Figure 5:
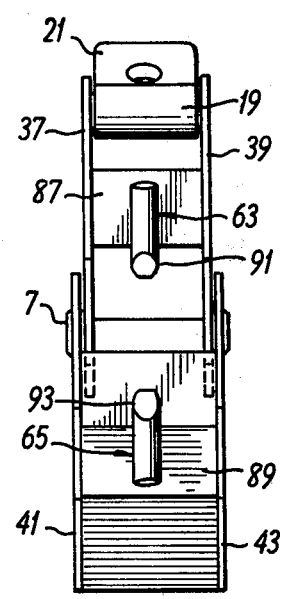
FIG. 5 is an end view of the device depicted in the previous figures particularly showing the beveled free ends of the jaw teeth for engaging opposed portions of a wheel assembly rim.

A more detailed description of the internal structure of device 1 shall now be provided with particular reference to FIGS. 3–5. As shown in FIG. 3, forks 11 and 15 are secured at one pair of corresponding ends to their respective handles 9 and 13, with their other pair of corresponding ends being connected to their respective jaws 3 and 5. Fork 11 includes a longitudinal slot 68 which is slightly wider than the diameter of lock bolt 29. Slot 68 is aligned with a slot 69 of corresponding shape and size provided in fork 15. Lock bolt 29 is freely disposed through slots 68 and 69, and includes a barrel washer 70 for engaging both head 35 of lock bolt 29 and fork 11 when lock bolt 29 is tightened to place device 1 in a position of use. A pivot nut 73 is received on a threaded end 74 of lock bolt 29 to bear against fork 15 when lock bolt 29 is tightened. Washer 70 and nut 73 are larger than their corresponding adjacent slots 68 and 69 in order to permit lock bolt 29 to be held loosely captive through slots 68 and 69 and shift in angular positioning in order to accommodate pivotal positioning of jaws 3 and 5. With jaws 3 and 5 being placed in a set desired position on a given wheel assembly, it is therefore apparent from FIG. 3 that rotation of lock bolt 29 will serve to bring head 35 and nut 73 toward each other and ultimately against forks 11 and 15, respectively. When this is accomplished, inward pivotal movement of jaws 3 and 5 is prevented by their contact with the wheel assembly and outward pivotal movement between jaws 3 and 5 is prevented by virtue of lock bolt 29. This serves to secure device 1 onto the wheel assembly, with removal of device 1 being accomplished only upon rotating lock bolt 29 in the opposite direction.

In order to secure spring 17 between handles 9 and 13, forks 11 and 15 are provided with a corresponding pair of opposed retainers 75 and 77, respectively. Retainers 75 and 77 are each of a substantially cylindrical shape and may be attached to its corresponding fork in any suitable manner. Retainers 75 and 77 are disposed within the opposite ends of spring 17 to secure the latter in position.

A cylindrical shaped spacer 79 may be disposed between upper and lower plates 37 and 39 of active jaw 3 for enclosing pivot pin 7. To impart enhanced structural integrity and strength to active jaw 3, an angled back plate 81 may further be disposed between plates 37 and 39 to enclose and protect both pivot pin 7 and lock bolt 29. Moreover, one or more reinforcement plates 83 may be disposed in the interior of jaw 3, with each plate 83 being preferably perpendicular to upper and lower plates 37 and 39, and at least secured to inner cover plate 45. By disposing a reinforcement plate 83 adjacent hasp pin 27, extra reinforcement and protection is afforded this latter structure. Similarly, passive jaw 5 may also be structurally reinforced by the provision of internal reinforcement plates 83 in substantially the same manner as active jaw 3. Passive jaw 5 is further strengthened by the provision of an outside cover plate 85 which extends between and is perpendicular to upper and lower plates 41 and 43, and also extends from fork 15 to tooth 65.

Teeth 63 and 65 are secured to the ends of their respective jaws 3 and 5 by providing a front plate 87 at the end of jaw 3 and a corresponding front plate 89 at the end of jaw 5. Teeth 63 and 65 are of a substantially elongate cylindrical configuration and provided with a pair of beveled or tapered free ends 91 and 93, respectively. Moreover, the longitudinal axes of teeth 63 and 65 are directed inwardly and intersect at a point substantially midway between jaws 3 and 5. The configuration and disposition of teeth 63 and 65 as hereindescribed are critical in permitting device 1 to be usable in conjunction with wheel assemblies having a multitude of different or uncommon rim configurations, particularly those associated with aircraft wheel assemblies.

As seen in FIG. 4, pivot nut 73 is of a substantially cylindrical configuration and extends through aligned apertures provided in upper and lower plates 41 and 43 of passive jaw 5. Threaded end 74 of lock bolt 29 is received through a correspondingly threaded transverse bore 95 provided in nut 73. The cylindrical configuration of teeth 63 and 65, and their respective beveled free ends 91 and 93, are more clearly shown with reference to FIG. 5. As seen therein, the longitudinal axes of teeth 63 and 65 are aligned substantially in a single plane.

Because of the security nature of device 1, it is highly preferable that most if not all of the components and parts making up device 1 be of a very hard and almost indestructible material, such as steel, and most preferably case hardened steel. Where parts are rigidly secured together, it is preferable that this be accomplished through heavy duty welding and, moreover, that the parts be of substantial thickness. It is also highly desirable that insofar as practical, the interior and exterior portions of device 1 be provided with a durable and rustproof coating, preferably epoxy paint.

As an example of preferred materials and dimensions for device 1, particularly in its intended use for immobilizing aircraft wheel assemblies, jaws 3 and 5 may be of eleven gauge hot-rolled carbon steel with a wheel assembly tire and metal rim lock range of two and a half inches to a maximum of eleven inches. The device should be capable of encircling standard aircraft tires and be of welded construction complete with necessary reinforcements for security against prying and tampering. Handles 9 and 13 should be approximately four inches in length, with spring 17 being of sufficient resiliency to assist in clamping device 1 onto the wheel assembly. Lock bolt 29 is preferably shielded five-eighth inch-sixteen cadmium plated and operable by a corresponding allen wrench. Padlock 67 should be a solid hardened steel security keyway padlock provided with keys that are serial numbered and can be duplicated only under certain limited conditions. Virtually all parts of device 1 are preferably case hardened through carburization, with the exception of spring 17.

It is to be understood that the forms of the invention herein shown and described are to be taken as preferred examples of the same and that various changes in the shape, size, materials and arrangement of parts may be resorted to without departing from the invention or the scope of the subjoined claims.

I claim:

1. An improved device for immobilizing a vehicle having at least one wheel assembly, which device comprises:
 (a) an active jaw;
 (b) a passive jaw;
 (c) each jaw being in the configuration of a C-shaped housing;
 (d) means connecting the jaws for pivotal movement between open and closed positions;
 (e) adjustment means disposed within and enclosed by both jaws for variably limiting the pivotal movement of the jaws;
 (f) an elongate tooth carried by each jaw for engaging opposed portions of the wheel assembly; and
 (g) locking means for preventing unauthorized removal of the device from the wheel assembly including:
   1. a hasp carried by the active jaw and pivotable between open and closed positions for concealing the adjustment means,
   2. a first flange carried by a free end of the hasp and provided with a first aperture therethrough,
   3. an exterior cover plate carried by the active jaw and including a second flange provided with a second aperture therethrough, and
   4. wherein when the hasp is disposed in its closed position, the hasp and the cover plate collectively define an exterior side wall of the active jaw, with the first and second apertures being aligned for receiving a padlock bale therethrough.

2. The device of claim 1 wherein:
 (a) each tooth is of a substantially cylindrical configuration and includes a beveled free end; and
 (b) the longitudinal axes of the teeth are directed inwardly and intersect at a point substantially midway between the jaws.

3. The device of claim 1 wherein the adjustment means includes a threaded bolt.

4. The device of claim 3 further including:
 (a) a pair of forks carried by the active and passive jaws;
 (b) a pair of aligned slots provided in the forks; and (c) wherein the threaded bolt is held freely captive through the slots for accommodating pivotal movement of the jaws.

5. The device of claim 1 further including:
 (a) a handle carried by each jaw; and
 (b) resilient means disposed between the handles for simultaneously biasing the handles outwardly and the jaws toward the closed position.

6. The device of claim 1 wherein the device is substantially entirely of case hardened steel.

7. The device of claim 1 wherein the adjustment means includes:
 (a) a threaded bolt carried by both jaws;
 (b) a cylindrical-shaped nut having a transverse threaded aperture therethrough, with opposite ends of the nut being secured in opposed portions of the passive jaw.

8. The device of claim 1 wherein the jaws each include means for strengthening same.

* * * * *